Jan. 26, 1943  L. M. PERSONS  2,309,531
STOKER CONTROL
Filed July 16, 1936
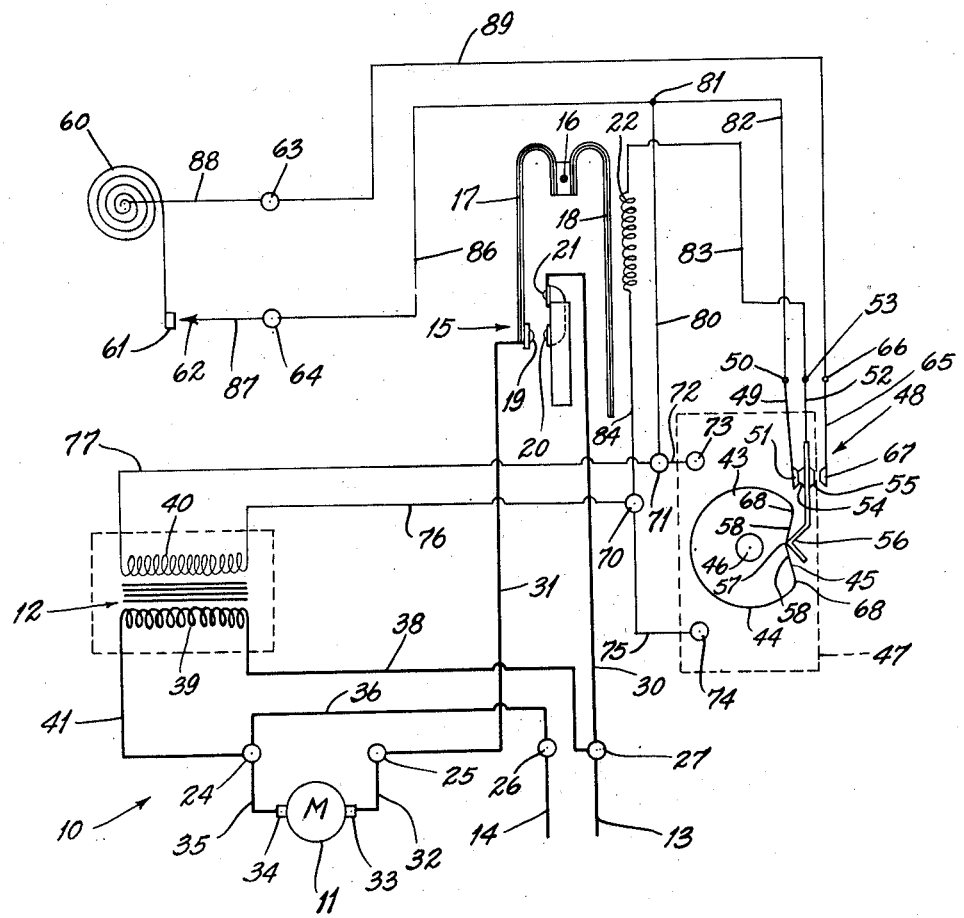
INVENTOR:
LAWRENCE M. PERSONS,
By Lawrence ter Kuigsland
ATTORNEY.

Patented Jan. 26, 1943

2,309,531

UNITED STATES PATENT OFFICE 2,309,531

STOKER CONTROL

Lawrence M. Persons, St. Louis, Mo., assignor, by mesne assignments, to Industrial Engineering Corporation, Terre Haute, Ind., a corporation of Indiana Application July 16, 1936, Serial No. 90,956

9 Claims. (Cl. 236—46)

The present invention relates generally to control means for a mechanism. It is particularly applicable as a control means for a power unit of a stoker used with coal furnaces, and the like, and includes a relay selectively energized by timed or thermostat means for predeterminately operating the power unit.

An object of the invention is to provide a motor or other similar mechanism, and two control devices operable to close the motor circuit, with means to render one of them inoperative during operation of the other.

Another object is to provide specifically a stoker control mechanism which includes, in cooperating relation, both a clock and a thermostatic means for selectively energizing a relay to close a switch to actuate a motor for feeding coal, or the like, to furnaces.

Another object is to provide a motor or other similar mechanism, with a temperature-responsive and a time-actuated means to control the operation of the motor, together with means rendering the temperature-responsive means inoperative during operation of the time-actuated means.

Another object is to provide a stoker control including a low voltage relay for controlling a high voltage line in which a stoker motor is connected.

Another object is to provide a stoker control which includes both timed and thermostat circuits as part of a relay, the thermostat circuit including a switch which is adapted to be opened when the timed circuit is energized to prevent operation of the stoker by the thermostat a predetermined period before, during, and a predetermined period after its operation by the timed circuit.

Other objects and advantages of the invention will appear from the following description thereof, taken in conjunction with the accompanying drawing in which:

The figure is a wiring diagram which shows a preferred embodiment of the present invention operatively installed in the electrical hook-up of a stoker motor, a stoker line switch, a transformer, and a relay including timed and thermostat circuits which are selectively energized.

Referring more particularly to the drawing by reference numerals, 10 indicates generally an assemblage which incorporates a preferred embodiment of the present invention.

A motor 11 for actuating a furnace stoker, or the like, and a transformer 12 are connected in parallel across a main line, the two leads to which are designated 13 and 14, respectively. A thermally-sensitive switch, generally indicated 15, is connected in series with the motor 11 and is adapted to control the energization thereof. The switch 15 includes a pivotal support 16, oppositely disposed U-shaped bimetallic members 17 and 18, a movable contact 19 on the member 17, a fixed contact 20, and a terminal 21 for the fixed contact 20. An exciting heater element 22 is disposed in heat-transferring relation to the member 18 and is connected in a relay which will be hereinafter described. Further details of a switch of the type preferred are incorporated in my copending application Serial No. 79,053, filed May 11, 1936, Patent No. 2,159,342, May 23, 1939. Terminals 24, 25, 26, and 27 are located on a base which supports the major portion of the assemblage.

When the assemblage is energized, the circuit through the motor is traced as follows: the current flows from the main line by the lead 13 to the terminal 27, and then successively through a lead 30, the terminal 21, the fixed contact 20, the movable contact 19, a lead 31, the terminal 25, a lead 32, a motor terminal 33, the motor 11, a motor terminal 34, a lead 35, the terminal 24, a lead 36, the terminal 26, and back out the lead 14 to the main line.

The circuit through the transformer 12, which is continuously energized in the primary, is traced as follows: The current flows from the main line by the lead 13 to the terminal 27, and then passes successively through a lead 38, a primary 39 of the transformer 12, a lead 41, the terminal 24, the lead 36, the terminal 26, and back out the lead 14 to the main line.

Referring now to the relay which controls the action of the switch 15, it includes timed and thermostat circuits which are interrelated through means of the present invention so that the thermostat circuit is rendered inoperative a predetermined interval before, during, and a predetermined interval after the energization of the timed circuit.

The timing mechanism includes a cam 43, which has a V-notch 45 in the periphery 44 and which is fixed to a post 46. The post 46 is connected to a clock encased in the box 47 which is mounted on the above referred to common base, and is rotated thereby at some predetermined speed, as one full rotation an hour. The detailed description of a preferred cam construction is found in my copending application Serial No. 88,714, filed July 3, 1936, Patent No.

2,207,942, July 16, 1940. A switch, generally designated 48, cooperates with the cam 43 and includes a switch blade 49 which is fixed at 50 to a support and carries a contact 51, and a resilient switch blade 52 which is supported at 53. The supports 50 and 53 serve as terminals also. The blade 52 carries at an intermediate point opposed contacts 54 and 55, and at the end remote from the support point 53 a V-shaped element 56 having the point 57. The element 56 is adapted to follow the periphery of the cam 43, and to dip into the V-notch 45 to close and open the switch 48. In one arrangement of the parts, the contact 54 will close with the contact 51 when the point 57 of the element 56 reaches a predetermined point 58 along one leg of the V-notch 45, and will remain so closed until the point 57 leaves a corresponding point 58 along the other leg of the V-notch 45. The switch 48 may be of an adjustable type such as is described in my said copending application Serial No. 88,714 filed July 3, 1936, or it may be nonadjustable.

A thermostat 60 is installed in a room, or the like, whose temperature it is desired to regulate. It includes two contacts 61 and 62, and is connected to terminals 63 and 64, which are supported by the common base.

The thermostat 60 is interrelated with the timed mechanism by means of a relatively fixed switch blade 65, which is supported at 66 and which carries the contact 67. The support 66 also serves as a terminal. The contact 67 cooperates with the contact 55, and is adapted to be closed therewith during the movement of the point 57 around the periphery 44 of the cam 43. When the point 57 reaches a selected point 68 along a leg of the V-notch 45, the contacts will open and remain open until a corresponding point 68 is reached on the other leg of the V-notch 45 by the point 57.

The clock above referred to is an electrically actuated mechanism. It is connected for constant energization to a secondary 40 of the transformer 12 through the terminals 70 and 71, and hence the secondary 40 is continuously energized. The clock circuit is traced as follows: terminal 71, lead 72, clock terminal 73, through the clock, clock terminal 74, lead 75, terminal 70, lead 76, secondary 40, lead 77, and back to terminal 71.

When closed by the dipping of the element 56 into the V-notch 45, the timed circuit is traced as follows: Starting at the common terminal 71, the current flows successively through a lead 80, a junction point 81, a lead 82, the support terminal 50, the blade 49, the contact 51, the contact 54, the blade 52, the support terminal 53, a lead 83, the heater element 22, a lead 84, the common terminal 70, the lead 76, the secondary 40, the lead 77, and back to the common terminal 71.

When the two sets of contacts 55, 67 and 61, 62 are closed, the thermostat circuit is traced as follows: starting at the common terminal 71, the current flows successively through the lead 80, the junction point 81, a lead 86, the terminal 64, a lead 87, the contact 62, the contact 61, the thermostat 60, a lead 88, the terminal 63, a lead 89, the support terminal 66, the blade 65, the contact 67, the contact 55, the blade 52, the terminal support 53, the lead 83, the heater element 22, the lead 84, the common terminal 70, the lead 76, the secondary 40, the lead 77, and back to the common terminal 71.

Operation

From the foregoing description, it is apparent that the switch 15, which controls the energization of the stoker motor 11, is adapted to be closed through the energization of the relay, either from the closing of the thermostat circuit, or the timed circuit.

In the instant illustration, the timed mechanism is constructed to actuate the stoker to fire the furnace one time during the rotation of the cam 43, which normally would require one hour. The V-element 56 follows a leg of the V-notch 45, due to its inherent resiliency and bias towards the center of the cam 43. When its point 57 reaches a selected point 58, the contacts 54 and 51 make and remain closed until the point 57 reaches and passes a corresponding point 58 on the other leg of the V-notch 45 when they open. The closing of the contacts 51 and 54 energizes the heater element 22, which actuates the bimetallic element 18 to close the switch 15 to energize the stoker motor to fire the furnace. The stoker motor will continue to actuate the stoker during the full period that the said contacts are closed. The distance between the points 58 determines the length of time that the contacts 54 and 51 remain closed, and this interval may be adjusted for instant installations.

In the travel into the V-notch 45 of the element 56 from the periphery 44, as its point 57 passes a selected point 68 on one leg thereof, the contacts 55 and 67 will open, and they will remain so until closed again by the point 57 reaching and passing a corresponding point 68 on the other leg of the V-notch 45. Thus, the thermostat circuit is rendered inoperative during the time interval that the element 56 is moving between the two points 68. This interval includes three distinct periods: A first period during which the element 56 moves from one point 68 to one point 58, when both the timed and thermostat circuits are open; a second period during which the element 56 moves from the one point 58 to the other point 58, when the timed circuit is closed and the thermostat circuit is still open; and a third period during which the element 56 moves from the other point 58 to the other point 68, when both the timed and the thermostat circuits are open. Thus, for a predetermined period before, during, and for a predetermined period after the operation of the timed circuit, the thermostat circuit is positively prevented from functioning to actuate the stoker to supply coal to the furnace. Even should the room demand heat and close the switch at the thermostat, the action will be ineffective to fire the furnace during the aforesaid time that the contacts 55 and 67 are open. This prevents the firing of the furnace immediately after or immediately before the operation of the timed mechanism, which obviates the otherwise ever present possibility of overloading the furnace with its attendant overrun of heat at the point of supply. As is well known, where wall thermostats are employed, such an overrun results in a subsequent period of cold in the room, for the thermostat will not drop to heat-demanding temperature as rapidly as the room due to heat retained in the wall, or other surface, upon which it is mounted.

During the period that the element 56 is following the periphery 44 of the cam 43, the contacts 55 and 67 are closed, so that closing of the room thermostat contacts 61 and 62 will effect an energization of the heater element 22 to close the switch 15 to operate the stoker motor 11 to fire the furnace.

Hence, there has been provided a control mechanism particularly adapted for use with furnace stokers, which assures a continuous fire in the furnace regardless of room or other temperatures, yet which obviates the possibility of overheating the point of heat supply. All of the advantages and objects sought have been obtained.

The present invention is susceptible of a number of applications, and they are fully contemplated as within the scope thereof.

It is to be understood that the above description and accompanying drawing are given by way of example and illustration, and not for limitation, the invention being limited only by the following claims.

What is claimed is:

1. In a device of the kind described, a circuit, and means controlling the energization of said circuit comprising two normally independent circuits one of which is closed by a time mechanism and the other of which includes a thermostat, means controlling said latter two circuits including a disc operatively connected to said time mechanism having a V-notch and a switch blade having a free end of a configuration to dip into the V-notch and to follow the periphery of the disc, means biasing said free end of the blade into continuous contact with the disc, said blade further having opposed contacts, a contact in each of said latter circuits, said opposed contacts, circuit contacts, blade, and disc being predeterminately disposed so that one of said opposed contacts engages one of said circuit contacts during the interval the free end is following the normal circumference of the disc and the other of said opposed contacts engages the other of said circuit contacts during selected travel of the free end within the V-notch.

2. In a mechanism of the kind described, a main circuit, normally independent means controlling the circuit, said means including two additional circuits adapted to control the main circuit, a time-controlled means in one additional circuit adapted to close the same at predetermined intervals of time, and to open again thereafter, a temperature-responsive mechanism in the other additional circuit adapted to close and to remain closed during such time as the temperature condition remains beyond a predetermined value, said temperature-responsive control circuit being normally continuously closed when the temperature-responsive mechanism is closed, said time-controlled means including a moving element and a switch blade moved by the element, said switch blade having a contact in both control circuits, with which it is selectively and separately engageable, such that when the moving element displaces the blade to close the time-controlled control circuit, the temperature-responsive control circuit is opened.

3. In a heating system of the character described, in combination with a furnace, an electrically operated fuel feeding device therefor and a room thermostat adapted to close in response to room temperature requirements; of two normally independent circuits for controlling the operation of said fuel feeding device, one of said circuits including the room thermostat and being normally closed when the room thermostat is closed, a contact in each of said circuits, a switch blade adapted to make contact alternately with said contacts, and time controlled means for operating said switch blade whereby the thermostat circuit is periodically broken and the other circuit is closed for a predetermined interval of time irrespective of room temperature requirements.

4. In a heating system of the character described, in combination with a furnace, an electrically operated fuel feeding device therefor and a room thermostat adapted to close in response to room temperature requirements; of two normally independent circuits for controlling the operation of said fuel feeding device, one of said circuits including the room thermostat and being normally closed when the room thermostat is closed, a contact in each of said circuits, a switch blade adapted to make contact alternately with said contacts, and time controlled means for operating said switch blade whereby the thermostat circuit is periodically broken and the other circuit is closed for a predetermined interval of time irrespective of room temperature requirements, said time-controlled means maintaining said thermostat circuit open for a definite timed duration substantially greater than the duration of periodic burner operation controlled by the other closed circuit.

5. In a heating system of the character described, in combination with a furnace, an electrically operated fuel feeding device therefor and a room thermostat adapted to close in response to room temperature requirements; of two normally independent circuits for controlling the operation of said fuel feeding device, one of said circuits including the room thermostat and being normally closed when the room thermostat is closed, a contact in each of said circuits, a switch blade adapted to make contact alternately with said contacts, and time controlled means for operating said switch blade whereby the thermostat circuit is periodically broken and the other circuit is closed for a predetermined interval of time irrespective of room temperature requirements, said time-controlled means maintaining said thermostat circuit open for a definite timed duration substantially greater than the duration of periodic burner operation controlled by the other closed circuit, said burner being subject to substantially continuous operation under control of the room thermostat between periodic time controlled operations.

6. In a system of the character described, in combination with an electrically operated stoker, a room thermostat adapted to close in response to room temperature requirements, a line voltage circuit to said stoker, and a relay controlled switch for closing and opening said line voltage circuit, a source of low voltage current, two normally low voltage circuits connecting said relay and source of low voltage current and including a movable switch blade common to both circuits whereby one of said low voltage circuits is closed when the other is opened, a time controlled mechanism for operating said switch blade, said time controlled means including means for operating said switch blade to close one of said low voltage circuits at regular predetermined intervals to operate said stoker irrespective of room temperature requirements for a duration substantially less than the other low voltage circuit is opened, said room thermostat being connected in series with one of said low voltage circuits.

7. In a heating system of the character described, in combination with a furnace, an electrically operated fuel feeding device therefor, and a room thermostat adapted to close in response to room temperature requirements; of two normally independent circuits for controlling the operation of the fuel feeding device, one of said circuits including the room thermostat and a contact, the other circuit including a contact separate from the first named contact, a switch blade adapted to make contact optionally with each of said circuit contacts, and time controlled means for operating said switch blade to engage the first named contact whereby the thermostat circuit is rendered subject to the exclusive control of the room thermostat for selected duration, and thereafter to engage the contact of the other circuit to operate the fuel feeding device for a predetermined time irrespective of room temperature requirements, said time controlled means operating to open said thermostat circuit for definite periods of time substantially greater than the duration of periodic fuel feeding operation controlled by the other circuit.

8. In a heating system of the character described, in combination with a furnace, an electrically operated fuel feeding device therefor, and a room thermostat adapted to close in response to room temperature requirements; of two normally independent circuits for controlling the operation of the fuel feeding device, one of said circuits including the room thermostat and a contact, the other circuit including a contact separate from the first named contact, a switch blade adapted to make contact optionally with each of said circuit contacts, and time controlled means for operating said switch blade to engage the first named contact whereby the thermostat circuit is rendered subject to the exclusive control of the room thermostat for selected duration, and thereafter to engage the contact of the other circuit to operate the fuel feeding device for a predetermined time irrespective of room temperature requirements, said time controlled means operating to open said thermostat circuit for definite periods of time substantially greater than the duration of periodic fuel feeding operation controlled by the other circuit.

9. In combination with a furnace and an electrically controlled fuel burner therefor; a circuit controlling the burner, and means controlling the energization of said circuit comprising two normally independent circuits, one of which includes a thermostat, means controlling said latter two circuits including a time actuated disc having a notched surface, a switch blade having a free end of a configuration to follow the surfaces of the disc and dip into the notch, means biasing the free end of the blade into contact with said disc, said blade being further provided with a pair of contacts, a pair of additional switch blades, one for each of the two independent circuits, contacts on said latter blades for cooperation respectively with the pair of contacts on said first named blade, said first named switch blade being operable by said disc to periodically make contact with one of the contacts to energize the fuel burner for a selected time independently of the thermostat conditions, and thereafter intermittently make contact with the other contact of the thermostat circuit, said thermostat circuit being rendered inoperative by said switch blade for a definite period of time substantially greater than the duration of periodic operation independently of thermostat conditions.

LAWRENCE M. PERSONS.